United States Patent [19]

Bay et al.

[11] Patent Number: 4,546,139

[45] Date of Patent: Oct. 8, 1985

[54] POLYBROMO DINAPHTHYL ETHERS

[75] Inventors: Paul G. Bay, Antioch; Nicodemus E. Boyer, Schaumburg; Kenneth J. Sienkowski, Downers Grove, all of Ill.

[73] Assignee: PPG Industries, Inc., Pittsburgh, Pa.

[21] Appl. No.: 505,508

[22] Filed: Jun. 17, 1983

[51] Int. Cl.$^4$ ............................................. C08K 5/06
[52] U.S. Cl. .................................. 524/367; 524/405; 524/409; 524/432
[58] Field of Search ................ 524/367, 405, 409, 432

[56] References Cited

U.S. PATENT DOCUMENTS

| T977,004 | 12/1978 | Dulat et al. | 524/405 |
|---|---|---|---|
| 2,312,437 | 3/1943 | Orth | 524/367 |
| 3,631,112 | 12/1971 | Kerschner | 524/367 |
| 3,830,779 | 8/1974 | Anderson | 524/367 |
| 3,833,540 | 9/1974 | Anderson | 524/367 |
| 3,869,424 | 3/1975 | Anderson | 524/367 |
| 4,144,288 | 3/1979 | Miano | 524/405 |
| 4,151,218 | 4/1979 | Lee | 524/405 |

FOREIGN PATENT DOCUMENTS

| 694074 | 9/1964 | Canada | 524/367 |
|---|---|---|---|
| 47-37164 | 9/1972 | Japan . | |
| 48-38223 | 11/1973 | Japan | 524/405 |

OTHER PUBLICATIONS

Chemical Abstracts: 78:15894d, 1973, 55:7043g, 47:7454a, 47:7028c.
Chemical Abstracts, vol. 47, 7453i, (1953).
Chemical Abstracts, vol. 55, 7043f, (1961).
Morel, "The Essentials of Perfume Compounding", Soap, Perfumery & Cosmetics, vol. 27, pp. 169–176, (1954).
Chemical Abstracts, vol. 1, 436$^9$, (1907).
Chemical Abstracts, vol. 47, 7028b, (1953).
Justus Liebigs Annalen Der Chemie, vol. 210, pp. 133–161, (1881).
Rodionow et al., "The Preparation of $\beta,\beta'$-Dinaphthyl Ether", Journal of The Society of Chemical Industry, vol. 42, pp. 509T–510T, (1923).
Tomita et al., "Studies on the Antibacterial Activity of Some Organic Compounds In Vitro", Journal of the Pharmaceutical Society of Japan, vol. 72, pp. 478–482, (1952).

Primary Examiner—Joseph L. Schofer
Assistant Examiner—N. Sarofim
Attorney, Agent, or Firm—George D. Morris

[57] ABSTRACT

Polybromo dinaphthyl ethers may be employed as fire retardant additives to polymers.

10 Claims, No Drawings

POLYBROMO DINAPHTHYL ETHERS

The present invention is polybromo dinaphthyl ether containing at least four bromo groups. Compounds of this class are fire retardant and are especially useful when in admixture with one or more polymers.

The bromo groups may be the only substituents or one or more minor additional substituents may be attached so long as their identities and their numbers do not seriously interfere with the fire retardant properties of the compound. Examples of such minor additional substituents include lower alkyl such as methyl and ethyl, and chloro. The presence of chloro groups is expected to improve the fire retardant properties, as compared to the molecule without the chloro groups.

An important class of polybromo dinaphthyl ethers within the invention includes compounds each of which is represented by the structural formula:

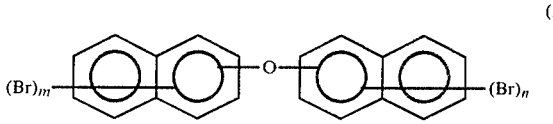

(I)

wherein $2 \leq m \leq 7$ and $2 \leq n \leq 7$.

One subclass of particular interest includes compounds each of which is represented by the structural formula:

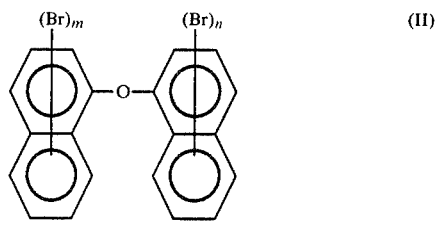

(II)

wherein $2 \leq m \leq 7$ and $2 \leq n \leq 7$.

Another subclass of especial interest includes compounds each of which is represented by the structural formula:

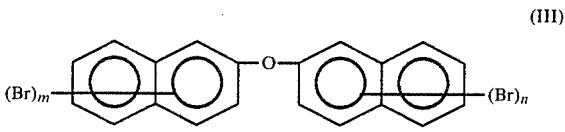

(III)

wherein $2 \leq m \leq 7$ and $2 \leq n \leq 7$.

Yet another subclass of interest includes compounds each of which is represented by the structural formula:

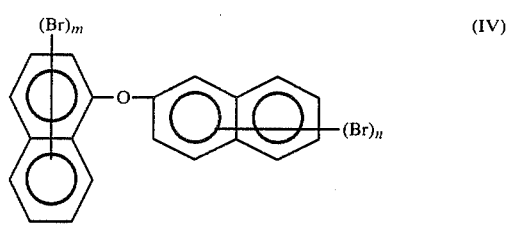

(IV)

wherein $2 \leq m \leq 7$ and $2 \leq n \leq 7$.

Although the values of m and n in Formulae I, II, III and IV are integers for any particular compound, it will be appreciated that for mixtures of compounds, they may be on the average any whole or fractional numbers within the stated ranges.

In Formulae I, II, III and IV, it is preferred that $4 \leq m \leq 6$ and $4 \leq n \leq 6$.

The polybromo dinaphthyl ethers of the invention may be conveniently prepared by brominating the corresponding dinaphthyl ethers. Examples of such ethers include 1,1'-dinaphthyl ether, 2,2'-dinaphthyl ether, 1,2'-dinaphthyl ether, 1,1'-bis(chloronaphthyl) ether, 2,2'-bis(chloronaphthyl) ether, 1,2'-bis(chloronaphthyl) ether, 1-naphthyl-1'-chloronaphthyl ether, 1,1'-bis(methylnaphthyl) ether and 2,2'-bis(methylnaphthyl) ether. Only a single dinaphthyl ether or a mixture of dinaphthyl ethers may be used as desired.

The bromination agent contains one or more bromine atoms per molecule, at least a portion of which is available under the conditions of the reaction for bromination of dinaphthyl ether. The bromination agent ordinarily employed is elemental bromine. Other bromination agents, however, may be used. Examples of other bromination agents which are satisfactory include bromine chloride, bromine fluoride, antimony (III) bromide, N-bromosuccinimide, acetyl hypobromite, hypobromous acid and $BrOH_2+$. Only a single bromination agent or a mixture of bromination agents may be used as desired.

The bromination reaction is usually conducted in the liquid phase. It may be carried out batchwise, continuously, semibatchwise or semicontinuously.

In many cases only a portion of the bromine content of the bromination agent is available for bromination. This may be due to a variety of causes. Undesired side reactions, for example, may sometimes consume a portion of the bromine. Often, the nature of the reaction itself is such that, even ideally, only a portion of the bromine content of the bromination agent is available for bromination. As an example of the latter situation, the reaction of one mole of elemental bromine with dinaphthyl ether results in the evolution of one mole of hydrogen bromide. The evolved hydrogen bromide is often recovered and used to produce other useful materials. In some instances the hydrogen bromide is oxidized to produce elemental bromine which may be used for further bromination. The oxidation may be conducted in situ, it may be conducted outside the bromination reaction zone, or it may be conducted using a combination of these procedures. It may be seen that the availability of bromine atoms for bromination is a factor to be considered in choosing relative proportions of bromination agent and dinaphthyl ether to be introduced to the reaction.

For purposes of the present invention, the availability ratio and the reactant ratio are defined as follows:

availability ratio = atoms of bromine available for bromination per molecule of bromination agent reactant ratio =

$$\frac{\text{moles of bromination agent introduced}}{\text{(moles of dinaphthyl ether introduced) (availability ratio)}}$$

The reactant ratio of bromination agent to dinaphthyl ether introduced to the reaction may vary widely. The reactant ratio is typically in the range of from about 4:1 to about 100:1. From about 8:1 to about 15:1 is preferred.

The bromination reaction is usually, but not necessarily, carried out in the presence of catalyst which is usually a polyvalent metal salt. The preferred catalysts are those of the Friedel-Crafts type, exemplified by aluminum chloride and aluminum bromide. Other satisfactory catalysts include ferric chloride, ferrous sulfate, cobalt carbonate, and the like. When catalyst is used, a single catalyst or a mixture of catalysts may be employed. The mole ratio of catalyst, when used, to the dinaphthyl ether initially present may vary widely but usually it is in the range of from about 0.0001:1 to about 2:1. From about 0.01:1 to about 1:1 is preferred.

The reaction may be conducted in the presence of extrinsic solvent, or no extrinsic solvent may be used. Examples of useful extrinsic solvents include methylene chloride, chloroform, carbon tetrachloride, acetic acid, methylene bromide, 1,2-dibromoethane, 1,1,2-tribromoethane, 1,1,2-trichloroethane, 1,1,2,2-tetrachloroethane, 1,1,1-trichloroethane, o-dichlorobenzene, and 1,2,4-trichlorobenzene. When extrinsic solvent is used, the weight of extrinsic solvent to the dinaphthyl ether initially present may vary widely, but generally it is in the range of from about 0.1:1 to about 1000:1. Typically the weight ratio is in the range of from about 0.5:1 to about 100:1. From about 1:1 to about 20:1 is preferred. Only one extrinsic solvent, a plurality of extrinsic solvents or no extrinsic solvent may be employed as is desired.

The temperatures at which the reaction is conducted may also vary widely, but ordinarily they are in the range of from about −20° C. to about +220° C. Preferably, the temperatures are in the range of from about 20° C to about 130° C.

The pressures at which the reaction is conducted are similarily susceptible to wide variation. Ambient atmospheric pressure is generally employed although greater or lesser pressures may be used.

Following preparation, the polybromo dinaphthyl ether may be recovered from the reaction mixture by any of the various techniques known to the art. Precipitation, filtration and drying are techniques which are frequently employed.

The polybromo dinaphthyl ether of the invention may be incorporated with polymer or polymer-containing composition to provide a composition having greater fire retardancy than in the absence of the polybromo dinaphthyl ether. The individual polybromo dinaphthyl ethers of the invention will be more effective with some polymers than with others, but in most cases the desired effect can be obtained by proper adjustment of the polybromo dinaphthyl ether concentration in the composition. The polymer may be flammable or non-flammable, but usually it is flammable. Typically the polymer is thermoplastic, but it may be thermosetting. The polymer may be a homopolymer, a copolymer, a terpolymer, an interpolymer, or a mixture of polymers. Examples of polymers in which the polybromo dinaphthyl ether of the invention may be used include acrylonitrile-butadiene-styrene interpolymer or graft polymer, polystyrene, high density polyethylene, low density polyethylene, polyesters, polyamides, and polycarbonates. The preferred polymers are acrylonitrile-butadiene-styrene graft polymer, polystrene, polyethylene, poly(butylene terephthalate), and aliphatic polyamide. The preferred aliphatic polyamides are poly(s-caprolactam) and poly(hexamethylene adipamide).

The amount of the polybromo dinaphthyl ether which is present in compositions of the invention is subject to wide variation. Such polybromo dinaphthyl ether is ordinarily present in an amount in the range of from about 0.1 percent to about 40 percent by weight of the polymer. From about 2 percent to about 25 percent by weight is preferred. Only one polybromo dinaphthyl ether or a plurality of polybromo dinaphthyl ethers may be used.

One or more other materials which increase fire retardancy may optionally also be present in the composition. Examples of such materials include zinc oxide, zinc borate, boric acid, borax, ferric oxide, antimony trioxide and antimony pentoxide. Antimony trioxide is preferred. The amounts of these materials are also subject to wide variation. When used, they are usually present in the composition of the invention in an amount in the range of from about 0.1 to about 15 percent by weight. An amount in the range of from about 1 percent to about 10 percent by weight is preferred.

The compositions of the invention may optionally contain plasticizers, pigments, dyes, tints, antioxidants, visible light stabilizers, ultraviolet light stabilizers, resinous pigment dispersants or grinding vehicles, and the like.

The listing of optional ingredients discussed above is by no means exhaustive. These and other ingredients may be employed in their customary amounts for their customary purposes so long as they do not seriously interfere with good polymer formulating practice.

The compositions of the invention are usually prepared by simply admixing the various ingredients. This may be accomplished in many instances by milling. If the polymer and the polybromo dinaphthyl ether are both soluble in solvent, they may be dissolved and mixed, and the polymer mixture recovered by removal of the solvent. Most often, the materials are admixed while the polymer is in the form of a melt. In those instances where the polybromo dinaphthyl ether is introduced as a solid, it is preferred that it be micronized or otherwise reduced in size to about 6 micrometers or less prior to the introduction.

The compositions of the invention have fire retardant characteristics and find many uses. Typically, they may be extruded into fibers, films or other shapes, or molded, shaped or formed into substantially any form. Where the polymers of the composition are soluble in solvent or are dispersible in liquid nonsolvents such as water, organic nonsolvent or miscible systems of water and organic liquid, the composition may be employed in coating compositions.

In the illustrative examples which follow, all parts are parts by weight and all percentages are percentages by weight unless otherwise specified.

EXAMPLE I

A 1-liter, 4-necked reaction flask equipped with a thermometer, a mechanical agitator, a funnel, an electric heating mantle and a watercooled vertical condenser with an aqueous sodium hydroxide trap, was charged with 13.5 grams of aluminum chloride and 196 milliliters of liquid bromine. An addition of 51.6 grams of 1,1'-dinaphthyl ether of 92.6% purity was made slowly through the funnel so the temperature would not rise above 50° C. during the addition. The temperature of the reaction mixture was raised to 55° C. where it was maintained for 2 hours, and then it was raised to 68° C. where it was maintained for about 2 hours. Heating was discontinued and the reaction mixture was allowed to cool to room temperature. About 2½ days after heating was discontinued, the reaction mixture was poured into 3.5 liters of ice water. The precipitate which formed was separated by filtration and washed with 600 milliliters of methanol. The washed solid was placed in a vacuum oven at 95° C. to 100° C. and an absolute pressure of 67 pascals for 4 hours. The solid was further dried for 20 hours at 160° C. under vacuum. The dried solid weighed 197.1 grams. One hundred ninety-five grams of the solid was ground and put through a sieve. Three hundred milliliters of methanol containing 190.6 grams of the sieved solid was refluxed for 24 hours. The solid was separated from the methanol by filtration and dried in a vacuum oven at 150° C. for 6 hours. The resulting product weighed 183.6 grams. The molecular weight of the product was found to be 1203 by liquid chromatography. The calculated molecular weight for $C_{20}H_2Br_{12}O$ is 1217.2. The product was analyzed for bromine. Found: 75.76%, 76.17% Br. Average Found: 75.97% Br. Calculated for $C_{20}H_2Br_{12}O$: 78.78% Br. Thermogravimtric analysis of the product in a flowing nitrogen atmosphere at a heating rate of 20° C/minute indicated a 5 percent weight loss at 307° C., a 10 percent weight loss at 358° C., a 20 percent weight loss at 395° C. and a 40 percent weight loss at 453° C. Infrared spectroscopy and nuclear magnetic resonance spectroscopy confirmed the structure as that of Formula II where the average values of m and n are each about 6.

EXAMPLE II

A 1-liter, 4-necked reaction flask equipped with a thermometer, a mechanical agitator, a funnel and a water-cooled vertical condenser with an aqueous sodium hydroxide trap, was charged with 18.7 grams of aluminum chloride and 270.5 milliliters of liquid bromine, with mechanical stirring. An ice bath was positioned under the flask. An addition of 71.4 grams of 2,2'-dinaphthyl ether of 97.8% purity was made slowly through the funnel so the temperature would not rise above 15° C. during the addition. After the addition was completed, the ice bath was removed and the reaction mixture was allowed to rise to room temperature. An electric heating mantle was placed around the flask and the temperature of the reaction mixture was raised to 63° C. where it was maintained for 1 hour. Heating was discontinued and the reaction mixture was allowed to cool to room temperature. About 2½ days after heating was discontinued, the reaction mixture was heated to 62° C. where it was maintained for 4 hours. Heating was discontinued and the reaction mixture was poured into 3 liters of ice water. The aqueous layer was removed and the remaining material was combined with about 700 milliliters of methanol. This mixture was refluxed for 4 hours. The solids were separated from the liquid by filtration. The flask was washed out with an additional 100 milliliters of methanol which was passed through the filter. The separated solids were dried in a vacuum oven at 140° C. for about 1½ hours. Heating was discontinued, but the solids were kept under vacuum overnight. The solids were ground and put through a sieve. The sieved solids were redried in a vacuum oven at 100° C. at an absolute pressure of 67 pascals for 3 hours and then in a vacuum oven at 140° C. and an absolute pressure of 67 pascals overnight. The resulting product weighed 200.5 grams and melted visually in the range of 145° C. to 151° C. without decomposition. The product was analyzed for bromine. Found: 71.08%, 71.20% Br. Average Found: 71.14% Br. Calculated for $C_{20}H_6Br_8O$: 70.97% Br. Thermogravimetric analysis of the product in a flowing nitrogen atmosphere at a heating rate of 20° C./minute indicated a 5 percent weight loss at 390° C., a 10 percent weight loss at 422° C., a 20 percent weight loss at 444° C. and a 40 percent weight loss at 468° C. Infrared spectroscopy and nuclear magnetic resonance spectroscopy confirmed the structure as that of Formula III where the average values of m and n are each about 4.

EXAMPLE III

A 1-liter, 4-necked reaction flask equipped with a thermometer, a mechanical agitator, an addition funnel and a water-cooled vertical condenser with an empty trap and an aqueous sodium hydroxide trap connected in series, was charged with 600 milliliters of 1,2-dibromoethane and 63.4 grams of 2,2'-dinaphthyl ether. The mixture was stirred at 25° C. until the 2,2'-dinaphthyl ether had dissolved. The addition funnel was charged with 337.4 grams of liquid bromine. A solid carbon dioxide-water-isopropanol bath was positioned under the reaction flask. When the temperature of the reaction mixture had reached 10° C., the dropwise addition of the liquid bromine was begun. The addition was completed in 2 hours. The exotherm caused the temperature of the reaction mixture to rise to 25° C. When the reaction mixture had cooled to 8° C., 7.9 grams of anhydrous aluminum chloride was added over a period of 1 minute. The reaction mixture was maintained at temperatures below 11° C. for about 2 hours and then allowed to warm to room temperature overnight. The solids of the reaction mixture were recovered by filtration and washed on the filter with 100 milliliters of 1,2-dibromoethane. The solids were then mixed thoroughly with the 1,2-dibromoethane filtrate, filtered, mixed thoroughly with 800 milliliters of methanol, again filtered, placed in an oven at 125° C. and an absolute pressure of 67 pascals for 8 hours, and then pulverized in a mortar and sieved. This material was placed in an oven at 135° C. and an absolute pressure of 67 pascals for 4 hours. The resulting product weighed 240.4 grams. The melting point as determined by differential scanning calorimetry was 303° C. with decomposition at approximately 355 C. The visual melting range was 325° C. to 330° C. The product was analyzed for bromine. Found: 74.60%, 74.72% Br. Average Found: 74.66% Br. Calculated $C_{20}H_4Br_{10}O$: 75.43% Br. Thermogravimetric analysis of the product in a flowing nitrogen atmosphere at a heating rate of 20° C./minute indicated a 5 percent weight loss at 414° C., a 10 percent weight loss at 441° C., a 20 percent weight loss at 463° C. and a 40 percent weight loss at 482° C. Infrared spectroscopy confirmed the structure as that of Formula III where the average values of m and n are each about 5.

EXAMPLE IV

A 3-liter, 4-necked reaction flask equipped with a thermometer, a mechanical agitator, an addition funnel and a water-cooled vertical condenser with a water trap, was charged with 120.1 grams of 2,2'-dinaphthyl ether, 1 liter of 1,2-dibromoethane and 35.6 grams of aluminum chloride. The addition funnel was charged with 1065.1 grams of liquid bromine. After stirring the materials charged to the flask at ambient temperature for a while, a solid carbon dioxide-water-isopropanol bath was positioned under the reaction flask. When the temperature of the reaction mixture had reached 10° C., the dropwise addition of the liquid bromine was begun. The addition was completed in 2¼ hours at the end of which time the temperature of the reaction mixture was 0° C. Stirring was discontinued overnight but the cooling bath was left in place for the solid carbon dioxide to evaporate gradually. The reaction mixture was then heated for a total of 8 hours at 65° C. over a period of 2 days. Approximately equal portions of the reaction mixture were poured into three beakers respectively, each beaker containing 2 liters of methanol. The solids which precipitated were collected by filtration and washed on the filter with 1 liter of methanol. The washed solids were placed in an open disk in a hood at ambient temperature for about 3½ days. The solids were then pulverized and sieved. The sieved solids were placed in an oven at 150° C. and an absolute pressure of 2 kilopascals for 6 hours. The resulting product weighed 436.5 grams. The melting point as determined by differential scanning calorimetry was 313° C. with decomposition at approximately 400° C. The product was analyzed for percent of elements. Found: 22.72% C, 0.41% H, 75.46% Br and 1.41% O (by difference). Calculated for $C_{20}H_4Br_{10}O$: 22.68% C, 0.38% H, 75.43% Br and 1.51% 0. Thermogravimetric analysis of the product in a flowing nitrogen atmosphere at a heating rate of 20° C./minute indicated a 5 percent weight loss at 378° C., a 10 percent weight loss at 420° C., a 20 percent weight loss at 442° C. and a 40 percent weight loss at 464° C. The infrared spectrum was identical to that of the product of Example III, confirming structure of the product of this example to be that of Formula III where the average values of m and n are each about 5.

EXAMPLE V

A 1-liter, 4-necked reaction flask equipped with a thermometer, a mechanical agitator, an addition funnel and a water-cooled vertical condenser with an empty trap and a trap containing 1400 milliliters of water connected in series, was charged at room temperature with 20.0 grams of 1,2'-dinaphthyl ether of 94.2 percent purity, 250 milliliters of 1,2-dibromoethane, and 2.0 grams of aluminum chloride. While mechanically stirring, the charged materials were cooled by an external solid carbon dioxide-isopropanol bath to −5 C. The addition funnel was charged with 141.9 grams of liquid bromine. The cooling bath was removed and the dropwise addition of liquid bromine was begun. The addition was completed in 30 minutes. During the addition, the temperature of the reaction mixture rose from −5° C. to +10° C. Stirring was continued for 1 hour while the temperature of the reaction mixture increased to 25° C. A further 2.5 grams of aluminum chloride was then added. The reaction mixture was heated to 75° C., maintained at temperatures of from 75° C. to 100° C. for 4 hours, and then allowed to cool overnight to room temperature. The reaction mixture was poured into a 4-liter beaker containing 2 liters of methanol. The solid which precipitated was recovered by filtration and washed on the filter with 250 milliliters of methanol. The solid was dried in an open glass dish at room temperature for 5 days and then in a vacuum oven at 120° C. and an absolute pressure of 667 pascals for 8 hours. The resulting solid weighed 54.6 grams. Infrared spectroscopy supported the structure as that of Formula IV where the average values of m and n are each about 4. Fifty grams of the solid was further dried in a vacuum oven at 145° C. and an absolute pressure of 400 pascals for 8 hours. The resulting product weighed 49.5 grams. The product was analyzed for bromine. Found: 70.75%, 70.38% Br. Average Found: 70.57% Br. Calculated for $C_{20}H_6Br_8O$: 70.91% Br. Thermogravimetric analysis of the product in a flowing nitrogen atmosphere at a heating rate of 10° C./minute indicated a 5 percent weight loss at 363° C., a 10 percent weight loss at 395° C., a 20 percent weight loss at 437° C. and a 40 percent weight loss at 478° C.

In the ensuing examples, a series of compositions, each containing an additive to be evaluated, antimony trioxide and polymer, were tested for fire retardance. For each of the compositions tested, polymer was introduced into a mixer and melted. A mixture of the additive to be evaluated and antimony trioxide was added to the melt and the materials were mixed until uniform to produce the composition. After cooling, each composition was heat pressed into sheets which were cut into bars. The bars were tested for flammability in accordance with the procedure of Vertical Burning Test 94, dated February 1, 1974, of Underwriters Laboratories, Inc., and in accordance with Standard Method of Test for Flmamability of Plastics Using the Oxygen Index Method, ASTM Standard Method D 2863-70, American Society for Testing and Materials. The polymers are abbreviated according to the following key:
ABS=acrylonitrile-butadiene-styrene graft polymer
HIPS=high impact polystyrene
PP=polypropylene
HDPE=high density polyethylene
PBT=poly(butylene terephthalate)
NYL=poly($\epsilon$-caprolactam).

EXAMPLE VI

The additive to be evaluated was the product of Example I. The identities of the polymers, the proportions of materials and the results are shown in Table 1.

TABLE 1

| | Proportions parts by weight | | | Vertical Burning Test UL 94 | | ASTM Method D 2863-70 |
|---|---|---|---|---|---|---|
| Polymer | Polymer | Additive | Antimony Trioxide | Classification | After Flame Time, seconds | Oxygen Index, percent $O_2$ by volume |
| ABS | 100 | 15 | 5 | 94V-2 | 2.8 | 31.5 |
| ABS | 100 | 17.3 | 4.4 | 94V-1 | 1.8 | 31.0 |
| HIPS | 100 | 12 | 4 | 94V-0 | 1.6 | 26.5 |
| PP | 100 | 5 | 2.5 | Fail | >30 | <22.0 |
| HDPE | 100 | 8.7 | 2.9 | 94V-2 | 8.9 | 24.0 |
| PBT | 100 | 12 | 3 | 94V-0 | 0.4 | 35.0 |

TABLE 1-continued

| Polymer | Proportions parts by weight | | | Vertical Burning Test UL 94 | | ASTM Method D 2863-70 |
| --- | --- | --- | --- | --- | --- | --- |
| | Polymer | Additive | Antimony Trioxide | Classification | After Flame Time, seconds | Oxygen Index, percent $O_2$ by volume |
| NYL | 100 | 30.4 | 7.6 | 94V-0 | 0.0 | 32.0 |

EXAMPLE VII

The additive to be evaluated was the product of Example II. The identities of the polymers, the proportions of materials and the results are shown in Table 2.

TABLE 2

| Polymer | Proportions, parts by weight | | | Vertical Burning Test UL 94 | | ASTM Method D 2863-70 |
| --- | --- | --- | --- | --- | --- | --- |
| | Polymer | Additive | Antimony Trioxide | Classification | After Flame Time, seconds | Oxygen Index, percent $O_2$ by volume |
| ABS | 100 | 15 | 5 | 94V-2 | 3.5 | 27.5 |
| ABS | 100 | 18.7 | 4.4 | 94V-0 | 0.4 | 32.0 |
| HIPS | 100 | 12 | 4 | 94V-2 | 6.6 | 25.0 |
| PP | 100 | 5 | 2.5 | Fail | >30 | 22.5 |
| HDPE | 100 | 8.7 | 2.9 | 94V-2 | 2.6 | 26.5 |
| PBT | 100 | 12 | 3 | 94V-2 | 0.8 | 32.5 |
| NYL | 100 | 30.4 | 7.6 | 94V-0 | 0.0 | 30.5 |

EXAMPLE VIII

The additive to be evaluated was the product of Example III. The identities of the polymers, the proportions of materials and the results are shown in Table 3.

TABLE 3

| Polymer | Proportions, parts by weight | | | Vertical Burning Test UL 94 | | ASTM Method D 2863-70 |
| --- | --- | --- | --- | --- | --- | --- |
| | Polymer | Additive | Antimony Trioxide | Classification | After Flame Time, seconds | Oxygen Index, percent $O_2$ by volume |
| HIPS | 100 | 12 | 4 | 94V-1 | 3.7 | 25.5 |
| PP | 100 | 5 | 2.5 | Fail | >30 | 22.0 |
| HDPE | 100 | 8.74 | 2.91 | 94V-2 | 1.3 | 27.5 |
| PBT | 100 | 12 | 3 | 94V-2 | 1.7 | 34.5 |
| NYL | 100 | 30.4 | 7.6 | 94V-0 | 0.0 | 32.5 |

EXAMPLE IX

The additive to be evaluated was the product of Example V. The identities of the polymers, the proportions of materials and the results are shown in Table 4.

TABLE 4

| Polymer | Proportions, Parts by weight | | | Vertical Burning Test UL 94 | | ASTM Method D 2863-70 |
| --- | --- | --- | --- | --- | --- | --- |
| | Polymer | Additive | Antimony Trioxide | Classification | After Flame Time, seconds | Oxygen Index, percent $O_2$ by volume |
| HIPS | 100 | 12 | 3 | Fail | >30 | NT[1] |
| PP | 100 | 5 | 2.5 | Fail | >30 | NT |
| HDPE | 100 | 8.7 | 2.9 | 94V-2 | 6.2 | NT |
| PBT | 100 | 12 | 3 | 94V-0 | 0.3 | NT |
| NYL | 100 | 30.4 | 7.6 | 94V-0 | 0.2 | NT |

[1]NT = Not Tested

Although the present invention has been described with reference to specific details of certain embodiments thereof, it is not intended that such details should be regarded as limitations upon the scope of the invention except insofar as they are included in the accompanying claims.

We claim:

1. A composition comprising (a) polymer, and (b) polybromo dinaphthyl ether containing at least four bromo groups.

2. The composition of claim 1 wherein said polybromo dinaphthyl ether is represented by the structural formula:

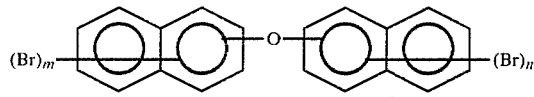

wherein $2 \leq m \leq 7$ and $2 \leq n \leq 7$.

3. The composition of claim 2 wherein $4 \leq m \leq 6$ and $4 \leq n \leq 6$.

4. The composition of claim 1 wherein said bromo groups are the only substituents of said polybromo dinaphthyl ether.

5. The composition of claim 1 wherein said polybromo dinaphthyl ether contains one or more minor substituents in addition to said bromo groups.

6. The composition of claim 1 wherein said polybromo dinaphthyl ether is present in an amount in the range of from about 0.1 to about 40 percent by weight of said polymer.

7. The composition of claim 1 additionally containing at least one member selected from the group consisting of antimony trioxide, antimony pentoxide, zinc oxide, zinc borate, boric acid, and borax.

8. The composition of claim 1 wherein said polymer is thermoplastic.

9. The composition of claim 1 wherein said polymer is flammable.

10. The composition of claim 1 wherein said polymer is polystyrene, acrylonitrile-butadiene-styrene graft polymer, polyethylene, poly(butylene terephthalate) or aliphatic polyamide.

* * * * *